(12) United States Patent
Paulo et al.

(10) Patent No.: US 12,162,142 B2
(45) Date of Patent: Dec. 10, 2024

(54) AUTOMATIC END-TO-END TESTING OF MOBILE APPLICATIONS DISPLAYING OPTICAL BARCODES

(71) Applicant: RAKUTEN GROUP, INC., Tokyo (JP)

(72) Inventors: Fernando de Araujo Paulo, Tokyo (JP); Dhananjaya Byranayakanahalli Honnappa, Karnataka (IN); Vivek Gokhale, Karnataka (IN); Vikram Mahendrakar, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 281 days.

(21) Appl. No.: 17/732,694

(22) Filed: Apr. 29, 2022

(65) Prior Publication Data

US 2023/0347531 A1 Nov. 2, 2023

(51) Int. Cl.
*B25J 9/16* (2006.01)
*B25J 19/00* (2006.01)

(52) U.S. Cl.
CPC .................. *B25J 19/0095* (2013.01)

(58) Field of Classification Search
CPC .... G05B 19/41875; G05B 2219/32183; G05B 2219/45089; G05B 2219/36371; G06F 11/22; B25J 19/0095; B25J 9/1679; B25J 11/00

See application file for complete search history.

(56) References Cited

U.S. PATENT DOCUMENTS

| 8,357,538 | B2* | 1/2013 | Self ............................ B01L 9/06 436/47 |
| 10,605,805 | B2* | 3/2020 | Chou ...................... G16H 80/00 |
| 10,979,439 | B1* | 4/2021 | Sharma ................... H04L 41/28 |
| 2009/0317002 | A1* | 12/2009 | Dein ...................... A61B 50/20 340/568.1 |
| 2016/0187876 | A1 | 6/2016 | Diperna et al. |
| 2018/0113774 | A1 | 4/2018 | Kyzlink et al. |
| 2021/0011824 | A1 | 1/2021 | Parsons et al. |
| 2022/0032465 | A1 | 2/2022 | Barthelemy et al. |

FOREIGN PATENT DOCUMENTS

| CN | 110619630 A | 12/2019 |
| EP | 3857380 A1 | 8/2021 |

(Continued)

OTHER PUBLICATIONS

Dommori et al., Designing and Implementing Intelligent Agents for e-Health, 2011, IEEE, p. 79-85 (Year: 2011).*

(Continued)

*Primary Examiner* — McDieunel Marc
(74) *Attorney, Agent, or Firm* — Sughrue Mion, PLLC

(57) ABSTRACT

A method, system, and apparatus are provided. The method includes receiving, with a coordinator component, a task for testing at least one electronic device, retrieving, by a first agent from the coordinator component, the task for testing the at least one electronic device, controlling a first robotic device to test the at least one electronic device based on the retrieved task, and receiving, with the coordinator component, a result of the task based on the testing of the at least one electronic device.

18 Claims, 8 Drawing Sheets

(56) References Cited

FOREIGN PATENT DOCUMENTS

JP        2020-501221 A      1/2020
WO     2018/073395 A1    4/2018

OTHER PUBLICATIONS

Papemo et al., A Predictive Model for Use of an Assistive Robotic Manipulator: Human Factors Versus Performance in Pick-and-Place/Retrieval Tasks, 2016, IEEE, p. 846-858 (Year: 2016).*
Ebadi et al., A Distributed and Concurrent Framework for Facilitating Cooperation in Dynamic Environments, 2010, IEEE, p. 287-294 (Year: 2010).*
Lin et al., Coordinating multi-agent systems by scripts, 1998, IEEE, p. 3442-3447 (Year: 1998).*
Extended European Search Report dated Sep. 25, 2023 in Appln No. 23170261.4.
Japanese Office Action dated Jun. 11, 2024 in Application No. 2023-005804.

* cited by examiner

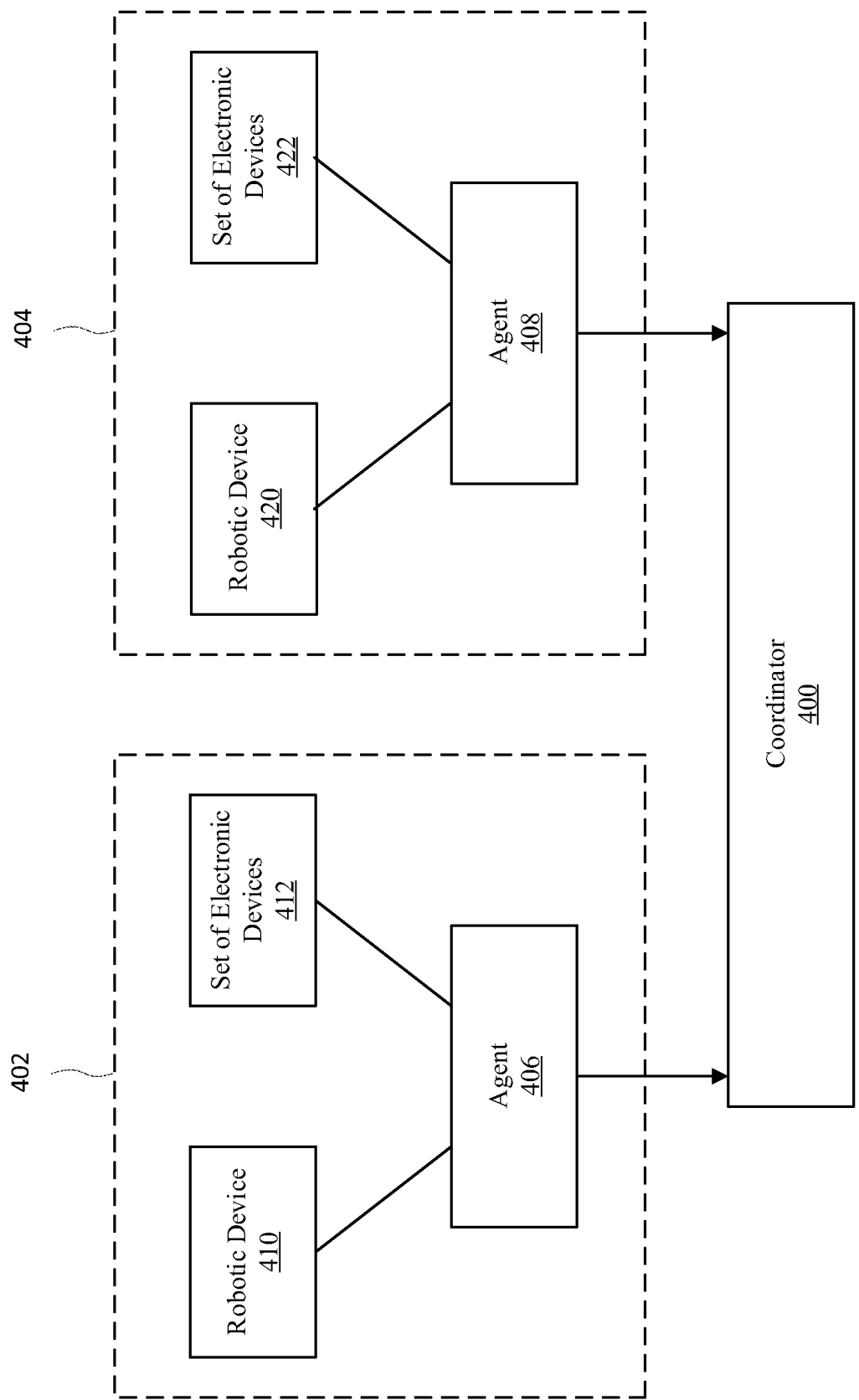

AUTOMATIC END-TO-END TESTING OF MOBILE APPLICATIONS DISPLAYING OPTICAL BARCODES

BACKGROUND

1. Field

The disclosure relates generally to a method, apparatus and system for end-to-end mobile application testing.

2. Description of Related Art

Currently, automated testing of applications exists for digital and some analog user methods. In analog methods, the analog information is converted into a digital format for testing. The conversion from analog to digital does not allow the test to simulate real-world user actions and conditions. In an example where a user presents a barcode on an electronic device for scanning in a physical store, to test this, a screenshot is taken of the barcode and an application is used to transform the screenshot into the barcode number. However, this process of automated testing does not accurately test how the analog optical barcode scanning signal is captured and does not take into account real-world conditions, such as ambient lighting conditions, scanning angle, device position and brightness settings.

SUMMARY

In accordance with an aspect of the disclosure, a method may include receiving, with a coordinator component, a task for testing at least one electronic device, retrieving, by a first agent from the coordinator component, the task for testing the at least one electronic device, controlling a first robotic device to test the at least one electronic device based on the retrieved task, and receiving, with the coordinator component, a result of the task based on the testing of the at least one electronic device.

In accordance with an aspect of the disclosure, a system may include a memory storing instructions and a processor configured to execute the instructions to receive, with a coordinator component, a task for testing at least one electronic device, retrieve, by a first agent from the coordinator component, the task for testing the at least one electronic device, control a first robotic device to test the at least one electronic device based on the retrieved task, and receive, with the coordinator component, a result of the task based on the testing of the at least one electronic device.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 4 is a diagram of a system for distributing testing tasks, according to an embodiment;

DETAILED DESCRIPTION

The following detailed description of example embodiments refers to the accompanying drawings. The same reference numbers in different drawings may identify the same or similar elements.

Figure 1:
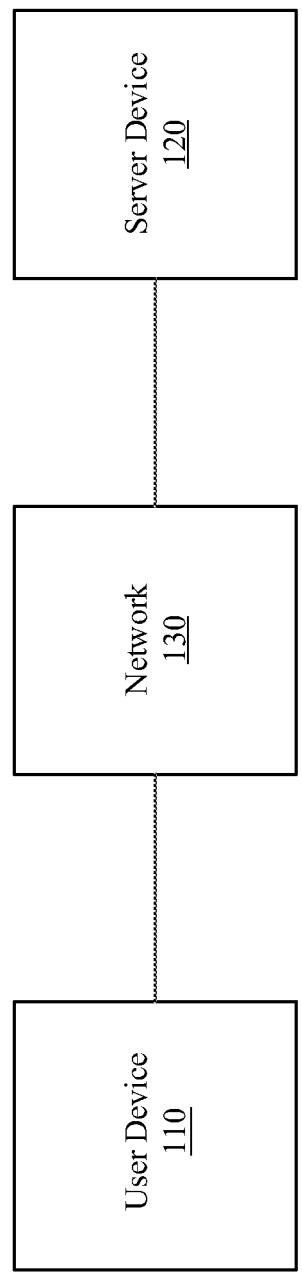
FIG. 1 is a diagram of devices of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 120 includes one or more devices. For example, the server device 120 may be a server device, a computing device, or the like.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
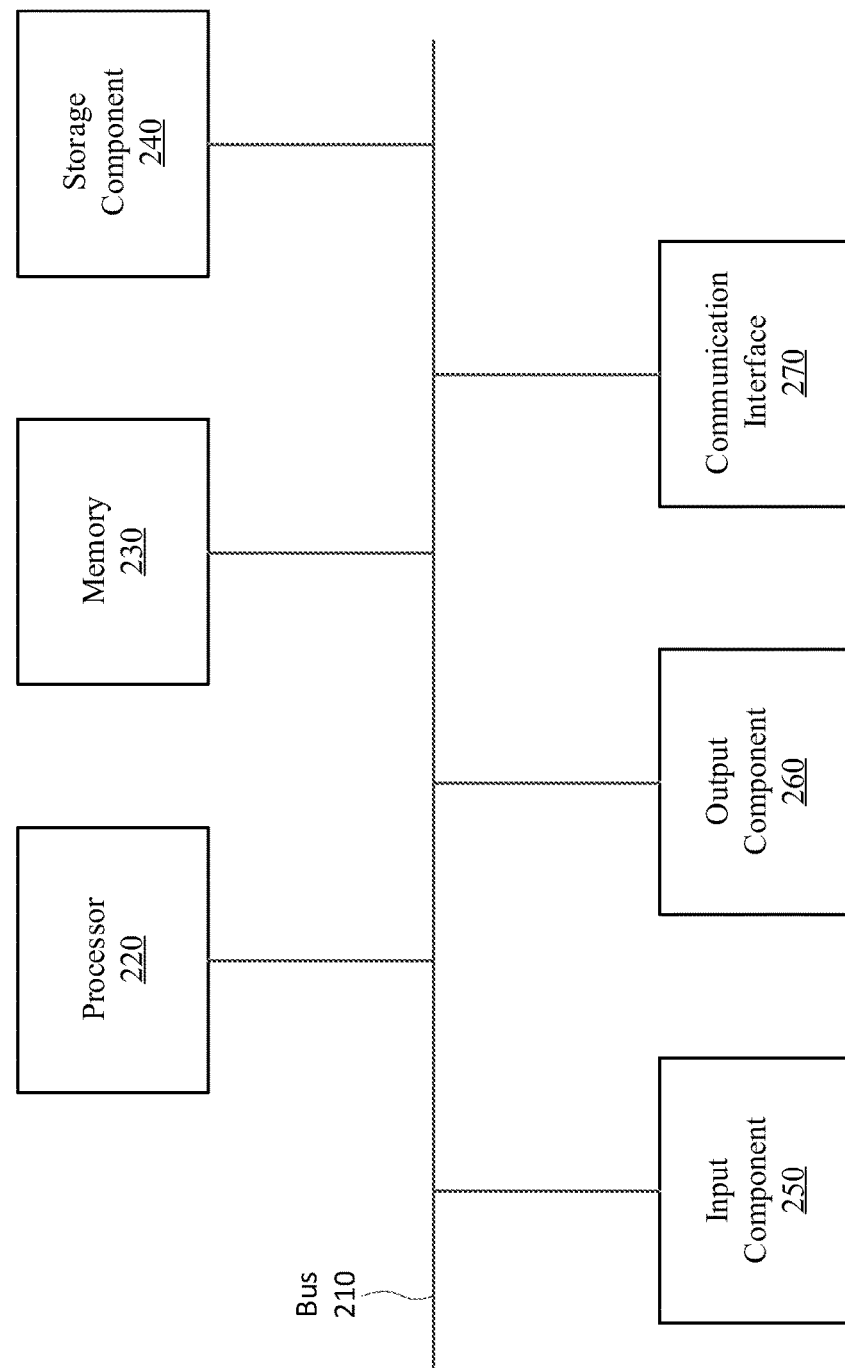
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Provided herein are a system and method that automatically perform end-to-end testing of real-world optical barcode scanning conditions for mobile applications that operate on electronic devices. The system and method simulate user conditions for barcode scanning testing, enhance barcode scanning testing environments to allow for multiple devices, and implement a scalable system including multiple scanning devices and robotic devices. The end-to-end testing system includes analog testing of barcode scanning functionality, testing of mobile application user interfaces (UIs) and testing of backend application programming interfaces (APIs). The system and method provide the ability to automate regression testing of mobile application analog optical barcode scanning processes end-to-end to simulate real-world user conditions, such as ambient lighting conditions, scanning angle, device position, brightness settings, barcode scanner characteristics, barcode positioning on the device, etc.

The system and method may be implemented with multiple testing environments and/or in multiple locations. For example, one testing environment may be located in a first locality and another testing environment may be located in a second locality. The localities may have different characteristics intrinsic to their respective locations, such as various types of global positioning system (GPS) signals, country codes, different physical conditions (e.g., lighting), devices only available in specific localities, brands of devices, etc. Thus, the system and method can perform the testing based on the location specific characteristics. Furthermore, the system and method with multiple testing environments provide "backups" in case one testing environment is unavailable (e.g., power outage, in use by another tester, etc.). Therefore, the system and method provide business continuity planning (BCP) (i.e., the system and method may be implemented and utilized without significant interruptions).

Figure 3:
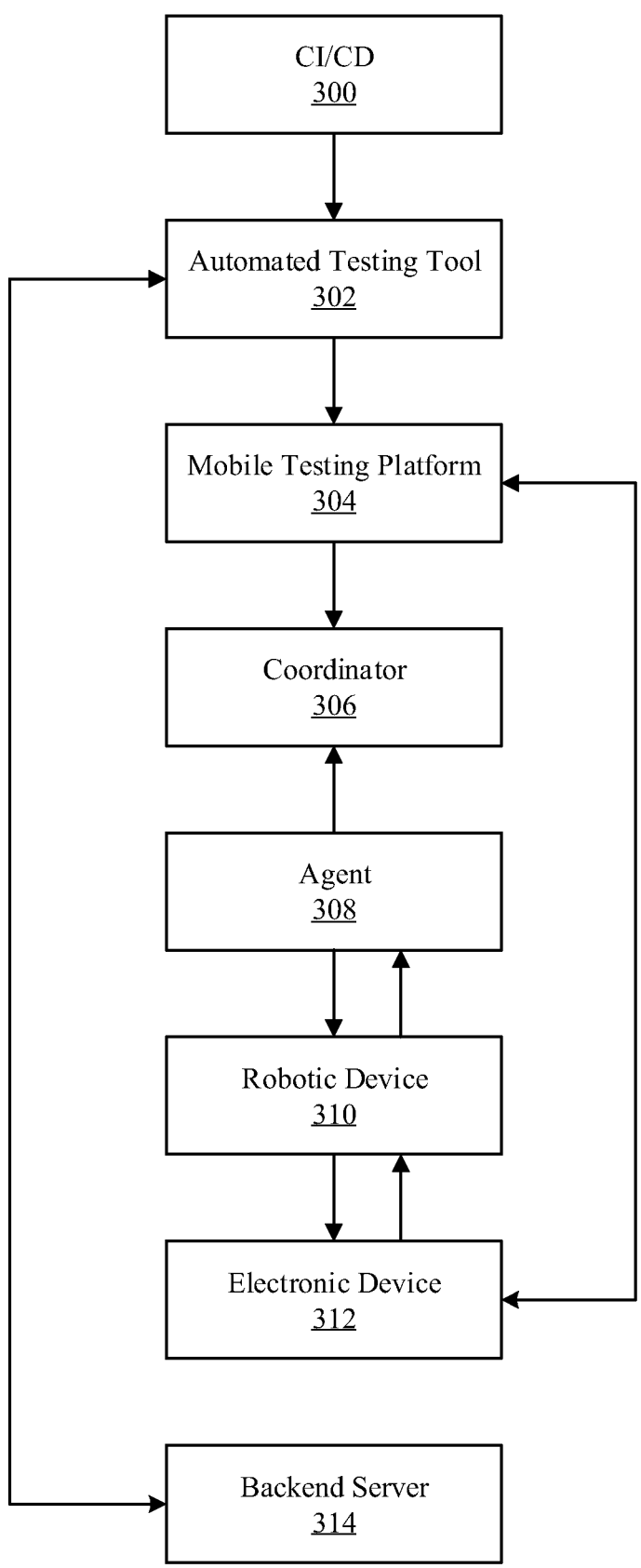
FIG. 3 is a diagram of a system for end-to-end mobile application testing, according to an embodiment.

FIG. 3 is a diagram of a system for end-to-end mobile application testing, according to an embodiment. The system may include a continuous integration (CI)/continuous delivery (CD) pipeline 300 (e.g., the system including the server device 120 and the network 130 in FIG. 1), an automated testing tool 302 (e.g., the system including the server device 120 and the network 130 in FIG. 1), a mobile testing platform 304 (e.g., the system including the server device 120 and the network 130 in FIG. 1), a coordinator 306 (e.g., the system including the server device 120 and the network 130 in FIG. 1), an agent 308 (e.g., the system including the server device 120 and the network 130 in FIG. 1), a robotic device 310, an electronic device 312 (e.g., the device 110 in FIG. 1), and a backend server 314 (e.g., the system including the server device 120 and the network 130 in FIG. 1). Although FIG. 3 depicts a system with single components, the system may include multiple components (e.g., a plurality of coordinators, a plurality of agents, a plurality of robotic devices, etc.)

The CI/CD pipeline 300 initiates execution of the automated testing.

The automated testing tool 302 may execute test cases and may function as the client that sends tasks to the coordinator 306. The automated testing tool 302 may be implemented as an external function. The automated testing tool 302 may be in communication with the mobile testing platform 304 and the backend server 314.

The mobile testing platform 304 may be implemented as a virtual device to install and control mobile applications on the electronic device 312. Thus, the mobile testing platform 304 may be in communication with the electronic device 312 and may configure the electronic device 312 to execute an application (e.g., a barcode application), such that the electronic device 312 displays a barcode for the testing task.

The coordinator 306 may operate as a central component that manages the tasks sent from the automated testing tool 302. The coordinator 306 may create a queue from the tasks received and assigns the tasks to agents as requested by the agents. In some embodiments, the agents request the tasks from the coordinator 306 such that the coordinator 306 does not initiate communication with the agents. Thus, multiple agents may be added to the system with ease, providing scalability and extensiveness. The coordinator 306 may include a user interface for authentication and login of users, and an agent interface for agent-coordinator communication.

The agent 308 may retrieve tasks from the coordinator 306. Although only one agent is depicted, the system may implement multiple agents.

FIG. 4 is a diagram of a system for distributing testing tasks, according to an embodiment. In the embodiment depicted in FIG. 4, the coordinator 400 may be in communication with a first testing environment 402 in a first location, and a second testing environment 404 in a second location. The first testing environment 402 may include an agent 406 in communication with the coordinator 400 and in communication with a robotic device 410 and, in some embodiments, a set of electronic devices 412. The second testing environment 404 may include an agent 408 in communication with the coordinator 400 and in communication with a robotic device 420 and, in some embodiments, a set of electronic devices 422. Due to the communication links between the agents 406 and 408 and the coordinator 400 (described in detail below), multiple network environments can be easily added or removed as needed/desired.

The agent 308 may be configured to execute tasks retrieved from the coordinator 306. The agent 308 may be configured to communicate one-way with the coordinator 306 to regularly check whether there are tasks in the coordinator queue. The one-way communication structure allows for dynamic scaling (i.e., adding or removing agents with ease) of the system to support multiple electronic devices and multiple agents. The agent 308 may be configured to control the robotic device 310 based on a retrieved task. The agent 308 may register itself with the coordinator 306.

The communication link between the coordinator 306 and the agent 308 may include multiple API endpoints. The first API endpoint may include a register endpoint, which is an entry point for agents, through which the agent 308 registers with the coordinator 306 and, if the registration is successful, the coordinator 306 adds the agent 308 to a list of registered agents.

The second API endpoint may include a request endpoint, which functions as a health check. The agent 308 sends a one-way communication with the coordinator 306 (which may have a static uniform resource locator (URL)) asking if the coordinator 306 currently has a request (i.e., the coordinator 306 does not initiate calls to the agent 308). If the coordinator 306 does not have sufficient requests from an agent, the coordinator 306 may assume that the agent is unavailable.

The third API endpoint may include a report endpoint. The agent 308 may send the result of a task to the coordinator 306. The agent 308 may also send the status or progress of a task to the coordinator 306 if the task is still running. For example, the agent 308 (or other software controlling the robotic device 310) may report to the coordinator 306 that the robotic device 310 has moved to a target device, has scanned the barcode, etc. The agent 308 may report a percentage completion status of the task (e.g., 10% complete, 90% complete, etc.).

Each API endpoint may include a different payload depending on the function of the API. For example, the request API endpoint may include a barcode.

The robotic device 310 (or, in some embodiments, robotic devices) may be configured to be controlled by the agent 308 (or other software) to perform the retrieved tasks. The robotic device 310 may have mounted on it or on an arm of the robotic device 310 a scanner or scanning device for scanning barcodes displayed on the electronic device 312. The robotic device 310 may be configured to scan multiple electronic devices. The robotic device 310 may include a physical slider or other movable structure (e.g., a track, a motion guideline, a motor, etc.) that allows the agent 308 to adjust the position of the robotic device 310 with respect to the electronic device 312 such that the robotic device 310 may be appropriately aligned with the electronic device 312 to perform the task (e.g., scan the barcode displayed on the electronic device). The physical slider/movable structure may allow the robotic device 310 to be moved horizontally, vertically, and in other directions (e.g., diagonally, rotatably, etc.).

The electronic device 312 may include one or more electronic devices capable of operating the application software that is the subject of the tasks, and having a display capable of, in some embodiments, displaying a barcode to be scanned by the robotic device 310. The electronic device or devices 312 may be arranged to be within the movable range of the robotic device 310 such that the robotic device 310 can be aligned to the electronic device 312.

The backend server 314 may include a server that hosts the backend of the application being tested.

Figure 5A:
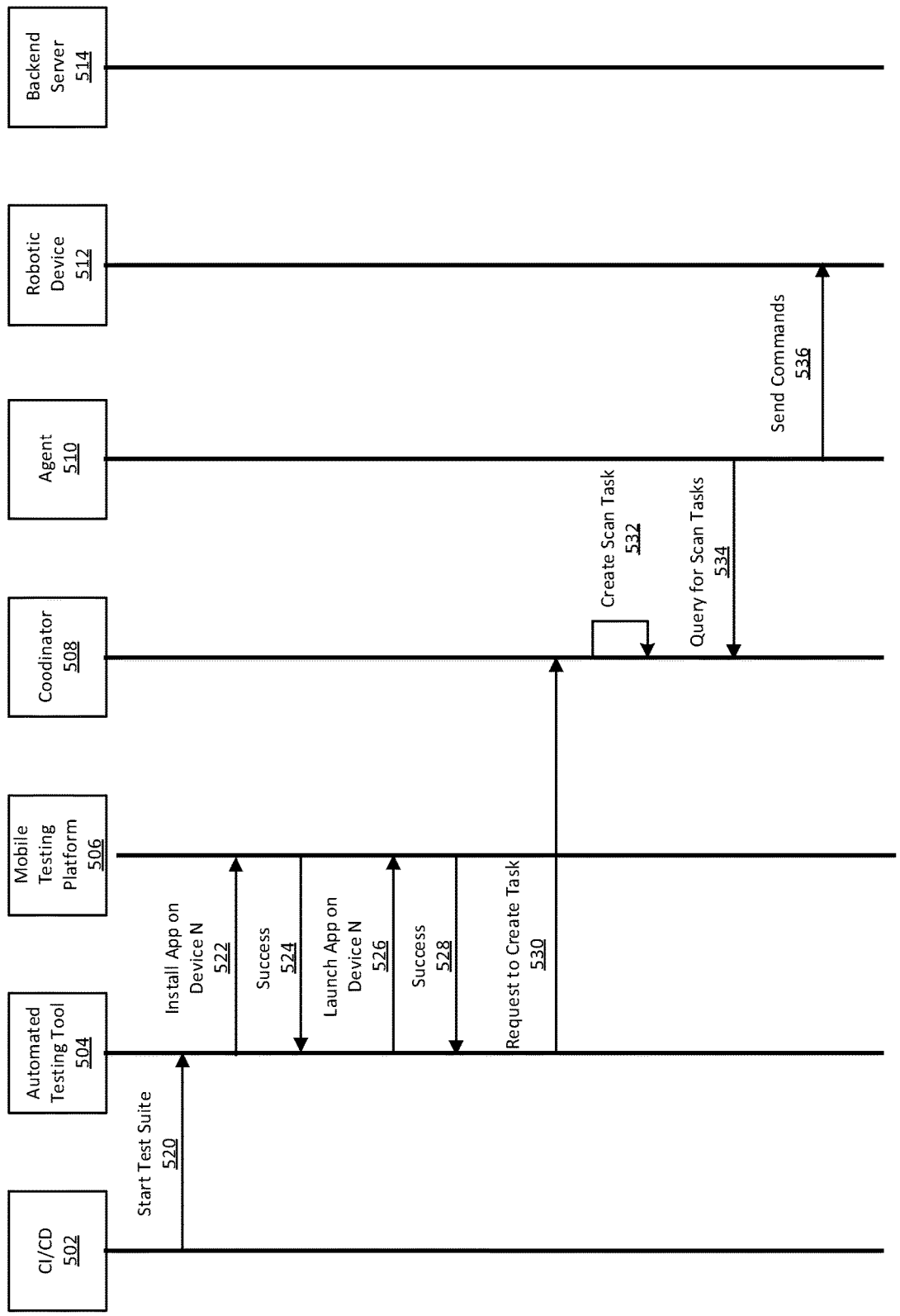
FIGS. 5A and 5B are diagrams of an operation flow for end-to-end mobile application testing, according to an environment.
Figure 5B:
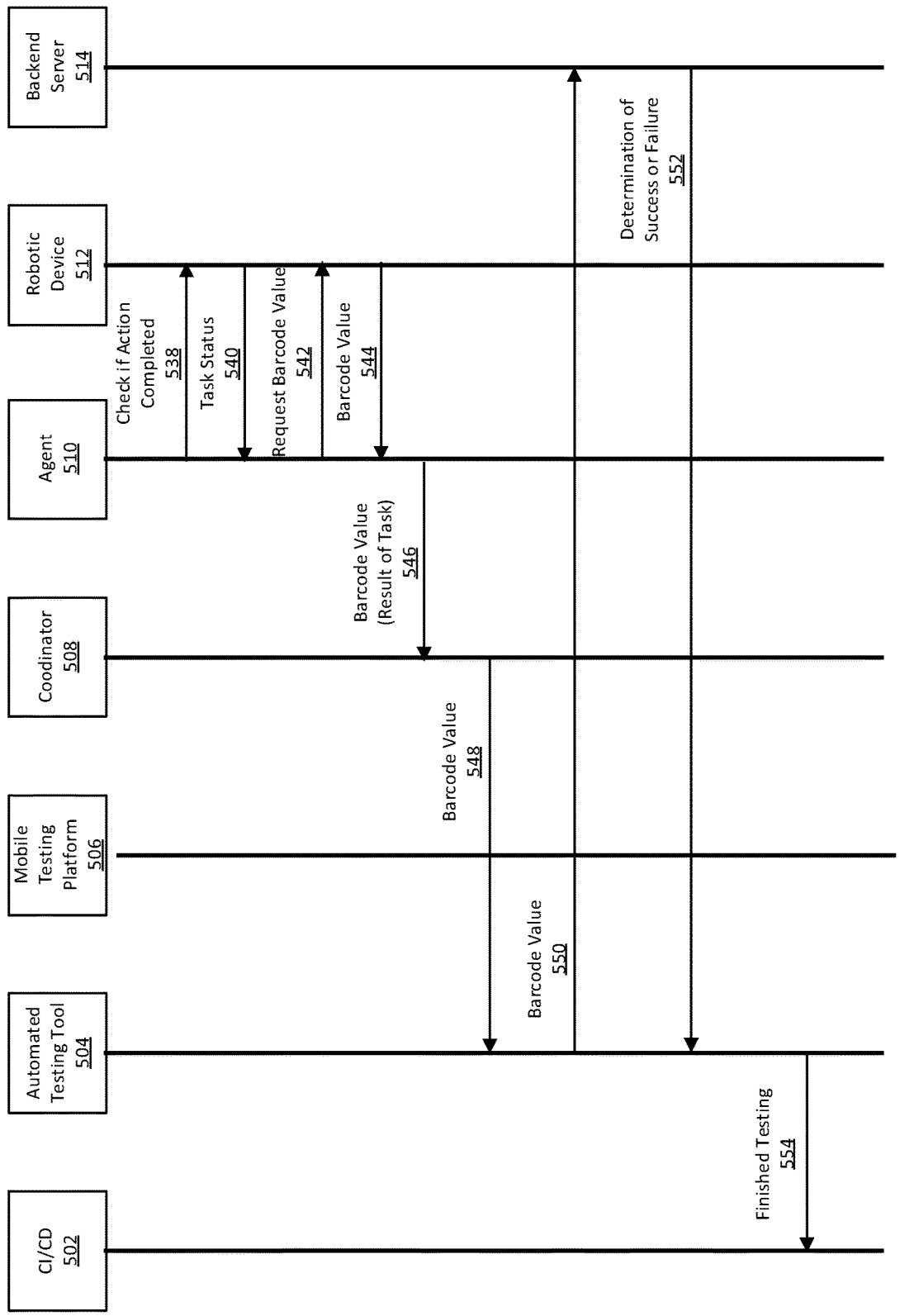

FIGS. 5A and 5B are diagrams of an operation flow for end-to-end mobile application testing, according to an environment. The system may include a CI/CD pipeline 502, and automated testing tool 504, a mobile testing platform 506, a coordinator 508, an agent 510, a robotic device 512 and a backend server 514. FIGS. 5A and 5B depict an example communication flow for one coordinator, one agent, and one robotic device. However, as described herein, multiple coordinators, agents, and robotic devices may be implemented.

In operation 520, the CI/CD 502 starts the test suite. In operation 522, the automated testing tool 504 sends an instruction to the mobile testing platform 506 to install the application to be tested on a target electronic device (e.g., device N). If the installation is completed, the mobile testing platform 506 sends a success confirmation in operation 524 to the automated testing tool 504. In operation 526, the automated testing tool 504 sends an instruction to the mobile testing platform 506 to launch the installed application on device N. In operation 528, if the launch is successful, the mobile testing platform 506 sends a success confirmation to the automated testing tool 504.

In operation 530, the automated testing tool 504 sends a request to the coordinator 508 to create a scanning task. In operation 532, the coordinator 508 creates the scan task. In operation 534, the agent 510 queries the coordinator 508 for a task. Operation 534 may be looped. When there is a task that is retrieved by the agent 510, in operation 536, the agent 510 sends commands 536 to the robotic device 512 to perform the task.

In operation 538, the agent 510 checks the robotic device 512 whether the task is completed, and in operation 540, the robotic device 512 sends the task status to the agent 510. Operations 538 and 540 may be looped until the task is completed. In operation 542, if the task is completed, for example, the agent 510 requests the barcode value 542 obtained by the robotic device 512 (i.e., the result of the task). In operation 544, the robotic device 512 sends the barcode value to the agent 510. In operation 546, the agent 510 sends the barcode value to the coordinator 508. In operation 548, the coordinator 508 sends the barcode value to the automated testing tool 504. In operation 550, the automated testing tool 504 sends the barcode value to the backend server 514. In operation 552, after the backend server 514 determines the result of the test, the backend server 514 sends the testing results (i.e., success or failure) to the automated testing tool 504. In operation 554, the automated testing tool 504 indicates to the CI/CD pipeline that the testing is finished with respect to a task.

Figure 6A:
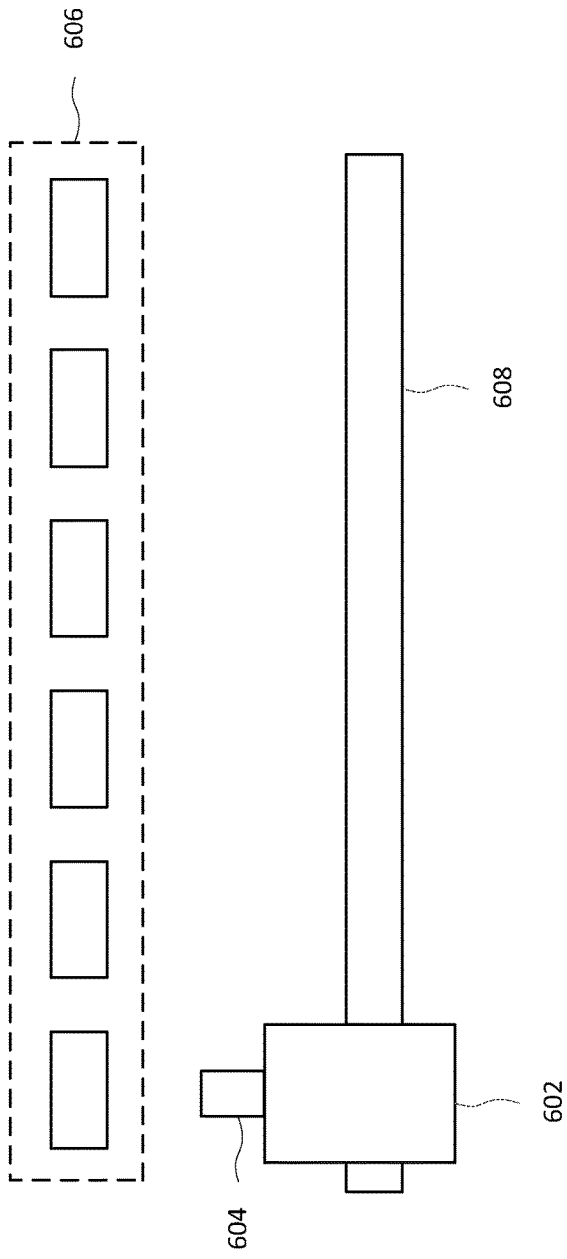
FIGS. 6A and 6B are diagrams of a mobile application testing environment, according to an embodiment.
Figure 6B:
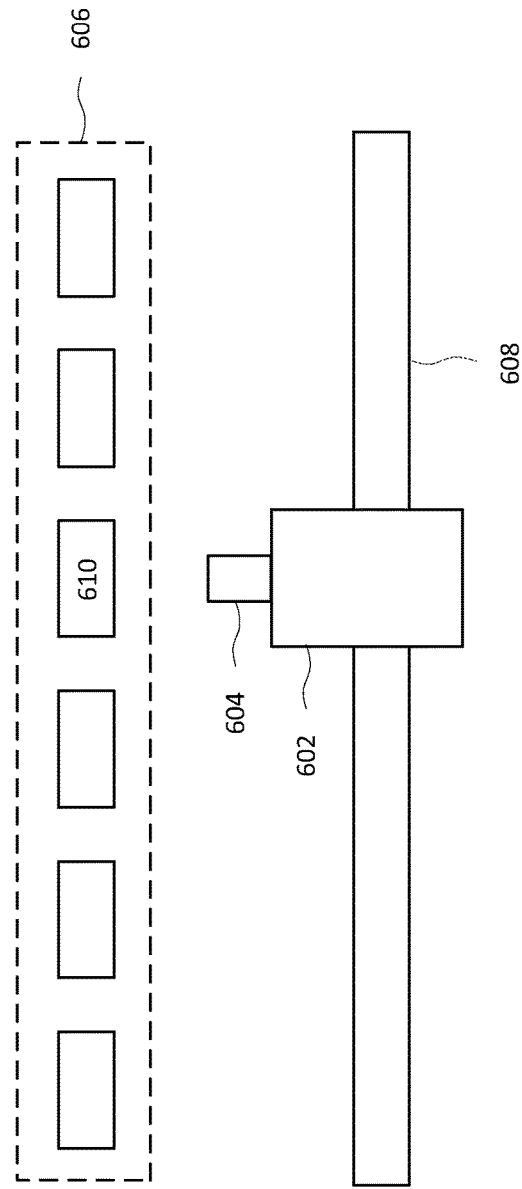

FIGS. 6A and 6B are diagrams of a mobile application testing environment, according to an embodiment. The testing environment includes a robotic device 602, a scanning device 604 mounted thereon, a plurality of electronic devices 606, and a movement track 608. An agent (or other software) may be configured to control the robotic device 602. When an agent retrieves a task to test electronic device 610, the agent may control the robotic device 602 to move along the movement track 608 from a first position shown in FIG. 6A to a second position shown in FIG. 6B so as to align the scanning device 604 with the electronic device 610 such that the robotic device 602 may scan a barcode displayed on the electronic device 610.

Figure 7:
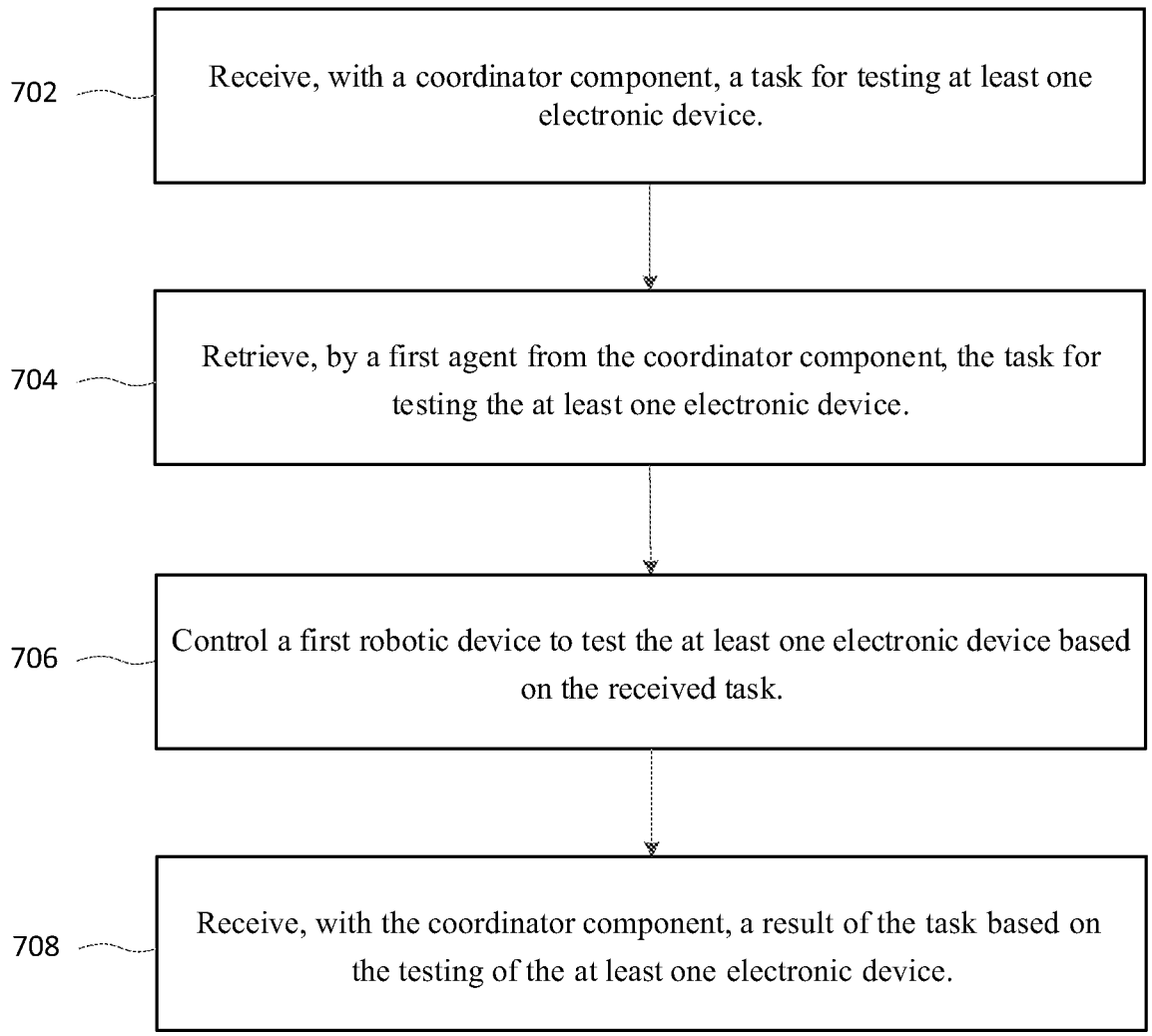
FIG. 7 is a flowchart of a mobile application testing method, according to an embodiment.

FIG. 7 is a flowchart of a mobile application testing method, according to an embodiment. In operation 702, the system may receive, with a coordinator component, a task for testing at least one electronic device. In operation 704, the system may retrieve, by a first agent from the coordinator component, the task for testing the at least one electronic device. In operation 706, the system may control a first robotic device to test the at least one electronic device based on the retrieved task. In operation 708, the system may receive, with the coordinator component, a result of the task based on the testing of the at least one electronic device.

Additional aspects may be implemented with the end-to-end testing process disclosed herein. For example, the robotic device may be equipped with multiple scanners to test variations in scanners with respect to the displayed barcodes. The robotic device may be configured to be controlled by the agent to also swap out scanners mounted thereon based on the retrieved task.

In further embodiments, the agent retrieving the task may additionally determine whether the agent can execute the task based on its corresponding testing environment. As described above, based on locality or other conditions, electronic devices may include various properties (e.g., a location of an electronic device, a lighting of an area in which an electronic device resides, a brand of an electronic device, a screen brightness of an electronic device, etc.) that are only testable in particular testing environments. The created task may include a task for testing electronic devices with particular properties, and the agent may determine whether any of the electronic devices within its corresponding testing environment include the properties to be tested. The agent may accept the task when its testing environment includes electronic devices that can be tested based on the particular properties of the task, and the agent may reject the task when its testing environment includes no electronic devices or an insufficient number of electronic devices that are needed to complete the task. In one example, the task may be to test electronic devices of a specific brand and/or a particular electronic device model. The agent may retrieve the task and then determine whether any of the electronic devices are of the specific brand and/or of the particular electronic device model. Then, the agent may accept or reject the task based on the determination.

Additionally, in some embodiments, the testing environments may be configured to simulate conditions. For example, the testing environment may be configured to simulate ambient lighting conditions, a scanning angle of the scanner, a resting angle of the devices, and brightness settings for the devices. Furthermore, the testing environments may be provided with monitoring apparatus to implement real-time monitoring of the testing environments. The inventory management of devices, the devices capabilities and settings, and the application versions may be centralized. Furthermore, the coordinator may provide a dashboard or interface for interacting with the testing environment and the overall system.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    sending, by an automated testing tool, an instruction to launch an application installed on at least one electronic device;
    displaying, on the at least one electronic device, a barcode generated by the application installed on the at least one electronic device;

receiving, with a coordinator component, a task for testing the at least one electronic device;
retrieving, by a first agent from the coordinator component, the task for testing the at least one electronic device;
controlling, by the first agent, a first robotic device to test the at least one electronic device based on the retrieved task by scanning, with the first robotic device, the barcode displayed on the at least one electronic device that is running the installed application; and
receiving, with the coordinator component, a result of the task based on the testing of the at least one electronic device.

2. The method of claim 1, wherein the first robotic device comprises a scanner, and
wherein controlling the first robotic device comprises aligning the scanner of the first robotic device with the barcode that is displayed on the at least one electronic device.

3. The method of claim 2, wherein aligning the scanner of the first robotic device comprises sliding the first robotic device from a first position where the first robotic device is not aligned with the barcode to a second position where the first robotic device is substantially aligned with the barcode.

4. The method of claim 1, wherein the result of the task comprises a barcode value generated by scanning the barcode.

5. The method of claim 1, further comprising generating the task for testing the at least one electronic device based on at least one electronic device property.

6. The method of claim 5, wherein retrieving the task for testing the at least one electronic device comprises determining, with the first agent, whether an electronic device of a set of electronic devices corresponding to the first agent includes the at least one electronic device property.

7. The method of claim 6, further comprising accepting, with the first agent, the task for testing the at least one electronic device based on determining that an electronic device of the set of electronic devices corresponding to the first agent includes the at least one electronic device property.

8. The method of claim 6, further comprising rejecting, with the first agent, the task for testing the at least one electronic device based on determining that no electronic devices of the set of electronic devices corresponding to the first agent include the at least one electronic device property.

9. The method of claim 5, wherein the at least one electronic device property comprises a location of an electronic device, a lighting of an area in which an electronic device resides, a brand of an electronic device, a model of an electronic device, or a screen brightness of an electronic device.

10. A system, comprising:
an automated testing tool configured to send an instruction to launch an application installed on at least one electronic device, the at least one electronic device displaying a barcode by launching the installed application;
a coordinator component configured to receive a task for testing at least one electronic device; and
a first agent configured to:
retrieve, from the coordinator component, the task for testing the at least one electronic device; and
test the at least one electronic device based on the retrieved task by controlling a first robotic device to scan the barcode displayed on the at least one electronic device that is running the application based on the instruction sent by the automated testing tool,
wherein the coordinator component is further configured to receive a result of the task based on the testing of the at least one electronic device.

11. The system of claim 10, wherein the first robotic device comprises a scanner, and
wherein the first agent is further configured to control the first robotic device by aligning the scanner of the first robotic device with the barcode that is displayed on the at least one electronic device.

12. The system of claim 11, wherein the first agent is further configured to align the scanner of the first robotic device by sliding the first robotic device from a first position where the first robotic device is not aligned with the barcode to a second position where the first robotic device is substantially aligned with the barcode.

13. The system of claim 10, wherein the result of the task comprises a barcode value generated by scanning the barcode.

14. The system of claim 10, wherein the coordinator component is further configured to generate the task for testing the at least one electronic device based on at least one electronic device property.

15. The system of claim 14, wherein the first agent is further configured to retrieve the task for testing the at least one electronic device by determining whether an electronic device of a set of electronic devices corresponding to the first agent includes the at least one electronic device property.

16. The system of claim 15, wherein the first agent is further configured to accept the task for testing the at least one electronic device based on determining that an electronic device of the set of electronic devices corresponding to the first agent includes the at least one electronic device property.

17. The system of claim 15, wherein the first agent is further configured to reject the task for testing the at least one electronic device based on determining that no electronic devices of the set of electronic devices corresponding to the first agent include the at least one electronic device property.

18. The system of claim 14, wherein the at least one electronic device property comprises a location of an electronic device, a lighting of an area in which an electronic device resides, a brand of an electronic device, a model of an electronic device, or a screen brightness of an electronic device.

* * * * *